US011262215B2

(12) United States Patent
Hammill et al.

(10) Patent No.: US 11,262,215 B2
(45) Date of Patent: Mar. 1, 2022

(54) SMART MEASUREMENT SYSTEM

(71) Applicant: Sensia LLC, Houston, TX (US)

(72) Inventors: Donald R Hammill, Calgary (CA);
Thomas Madden, Duncan, OK (US);
Thomas Neilson, Duncan, OK (US);
Daniel B. Baxter, Layton, UT (US)

(73) Assignee: Sensia LLC, Houston, TX (US)

(*) Notice: Subject to any disclaimer, the term of this patent is extended or adjusted under 35 U.S.C. 154(b) by 545 days.

(21) Appl. No.: 14/028,988

(22) Filed: Sep. 17, 2013

(65) Prior Publication Data

US 2015/0077266 A1 Mar. 19, 2015

(51) Int. Cl.
*G08B 23/00* (2006.01)
*G01D 4/00* (2006.01)

(52) U.S. Cl.
CPC .............. *G01D 4/004* (2013.01); *Y02B 90/20* (2013.01); *Y04S 20/30* (2013.01)

(58) Field of Classification Search
CPC .......... G01D 4/004; G01D 21/00; G01F 1/00; G01F 22/00; G01F 1/075; G01F 1/115; G01F 1/76; G01F 23/00; G01F 1/40; F17D 5/02; G10D 21/00; Y04S 20/30; Y02B 90/20
USPC ..................................... 340/870.02
See application file for complete search history.

(56) References Cited

U.S. PATENT DOCUMENTS

| 6,047,250 | A | * | 4/2000 | Beaudoin | G01F 1/065 |
| | | | | | 702/188 |
| 6,267,291 | B1 | * | 7/2001 | Blankenship | B23K 9/1062 |
| | | | | | 235/375 |
| 9,038,887 | B1 | * | 5/2015 | O'Hanlon | G06Q 20/02 |
| | | | | | 235/375 |
| 2004/0167735 | A1 | * | 8/2004 | Rothman | G01F 1/74 |
| | | | | | 702/100 |
| 2006/0056370 | A1 | * | 3/2006 | Hancock | H04B 7/2606 |
| | | | | | 370/338 |
| 2006/0235488 | A1 | | 10/2006 | Nycz et al. | |
| 2007/0029388 | A1 | * | 2/2007 | Liu | G01D 3/02 |
| | | | | | 235/462.13 |
| 2007/0193334 | A1 | * | 8/2007 | Hays | G01F 1/8436 |
| | | | | | 73/1.34 |
| 2007/0200712 | A1 | * | 8/2007 | Arneson | G06K 7/0008 |
| | | | | | 340/572.8 |

(Continued)

FOREIGN PATENT DOCUMENTS

| JP | 2008015855 | 1/2008 |
| KR | 20050118748 | 12/2005 |
| KR | 20070076786 | 7/2007 |

OTHER PUBLICATIONS

International Search Report and Written Opinion of PCT Application No. PCT/US2014/055938 dated Dec. 22, 2014: pp. 1-10.

(Continued)

*Primary Examiner* — Naomi J Small
(74) *Attorney, Agent, or Firm* — Foley & Lardner LLP

(57) ABSTRACT

A system and method are presented for collecting and retrieving characterization data of measurement devices, such as flow meters. The system includes a meter, a radio frequency identification (RFID) tag for storing the meter characterization data, and electronics, such as a totalizer, to read the characterization data from the RFID tag and calibrate the meter measurements using the characterization data.

31 Claims, 3 Drawing Sheets

(56) References Cited

U.S. PATENT DOCUMENTS

| | | | |
|---|---|---|---|
| 2008/0011821 A1 | 1/2008 | Ellender et al. | |
| 2008/0088464 A1* | 4/2008 | Gutierrez | G01F 15/063 340/606 |
| 2008/0296208 A1 | 12/2008 | Ikeyama et al. | |
| 2009/0115626 A1* | 5/2009 | Vaswani | G01D 4/004 340/870.02 |
| 2009/0150096 A1* | 6/2009 | Brown | G01F 15/024 702/45 |
| 2010/0262380 A1* | 10/2010 | Matievich, Jr. | G01N 33/48 702/22 |
| 2011/0004764 A1* | 1/2011 | Stuber | H04W 12/084 713/176 |
| 2011/0154911 A1* | 6/2011 | Ge | G01F 1/28 73/861.11 |
| 2013/0306183 A1 | 11/2013 | Sawchuk et al. | |
| 2014/0027000 A1 | 1/2014 | Kiest, Jr. | |
| 2014/0041436 A1 | 2/2014 | Knott et al. | |
| 2014/0060161 A1 | 3/2014 | Schick et al. | |
| 2014/0111342 A1* | 4/2014 | Ramsay | G01F 1/662 340/606 |
| 2014/0238148 A1* | 8/2014 | Priyadarshana | G01F 1/662 73/861.28 |

OTHER PUBLICATIONS

CA Office Action other than Search Report on CA Appl. Ser. No. 2922764 dated Oct. 21, 2020 (4 pages).

CA Office Action on CA Appl. Ser. No. 2922764 dated Aug. 25, 2021 (5 pages).

\* cited by examiner

SMART MEASUREMENT SYSTEM

BACKGROUND

Oil and natural gas are recognized as valued commodities. These fluids that may include comingled by-products are produced from wells that tap specific subterranean geologic formations. Quantitative measurement of the amounts of all fluids drawn from or placed in the geologic formation is valuable information toward the development and management of the resource. After the fluids and their byproducts are brought to the surface until the fluids are consumed or by-products are disposed of, the fluids undergo many processes to purify them. Once suitable for market these fluids are transported and commercially traded. To properly manage and account for these fluids, repetitive quantitative measurements are often made as the fluids undergo various stages of purification, transportation, storage, and trade all prior to consumption.

Many types of flow meters exist to accommodate a variety of fluid characteristics and flowing conditions. For example, there may be different flow meter types/models for different flow tube line sizes, tube materials, rates of flow, pressure ratings, temperature ratings, and accuracy ratings, etc. These varieties of flow meter types also vary as some meters express flow quantities in terms of units of mass while other types express units of volume. The meter's principle of operation may result in an initial measurement of the rate of flow or discrete increments of quantity.

One such type of flowmeter is a turbine type which possesses an element that is in contact with the fluid. It rotates at a variable speed that is proportional to the volume rate of fluid flow. Certain types of turbine flow meters are designed to output one or more electrical pulses for each discrete increment in volume. The number of pulses per unit of volume is referred to as a K-factor. These pulses are captured by a separate electronic device that considers the increment of time and the K-factor. The computed values of either or both flow total and flow rate are communicated visually and in various electrical or electronic formats. This separate electronic device will subsequently be referred to as the meter electronics.

The meter calibration K-factor values can by derived from measurements under test conditions, such as at the factory. Each individual flow meter may have multiple unique characteristics that the meter electronics must account for to achieve optimum measurement performance. For example, the response curve for a flow meter may not be linear over the entire operating range. Therefore, a flow meter may have multiple K-factors, each at a different rate of flow. In another example, some flow meter types can require special compensation algorithms or be calibrated across a range of fluids or operating conditions.

Another type of flow meter is a cone meter that uses a discharge coefficient with respect to a flow parameter referred to as a Reynolds number. Cone meters are flow tested and shipped with the Reynolds number performance information that is then later entered into a flow computer similar to the K-factor values for other meters.

Normally, it is difficult or tedious to enter multiple K-factors or other characterization factors for flow meters into the meter electronics. Manually entering multiple characterization points can lead to errors in data. Further, only a limited amount of data can be entered. Not having information on a flow meter's characteristics and operating range can lead to less accuracy in flow measurements.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
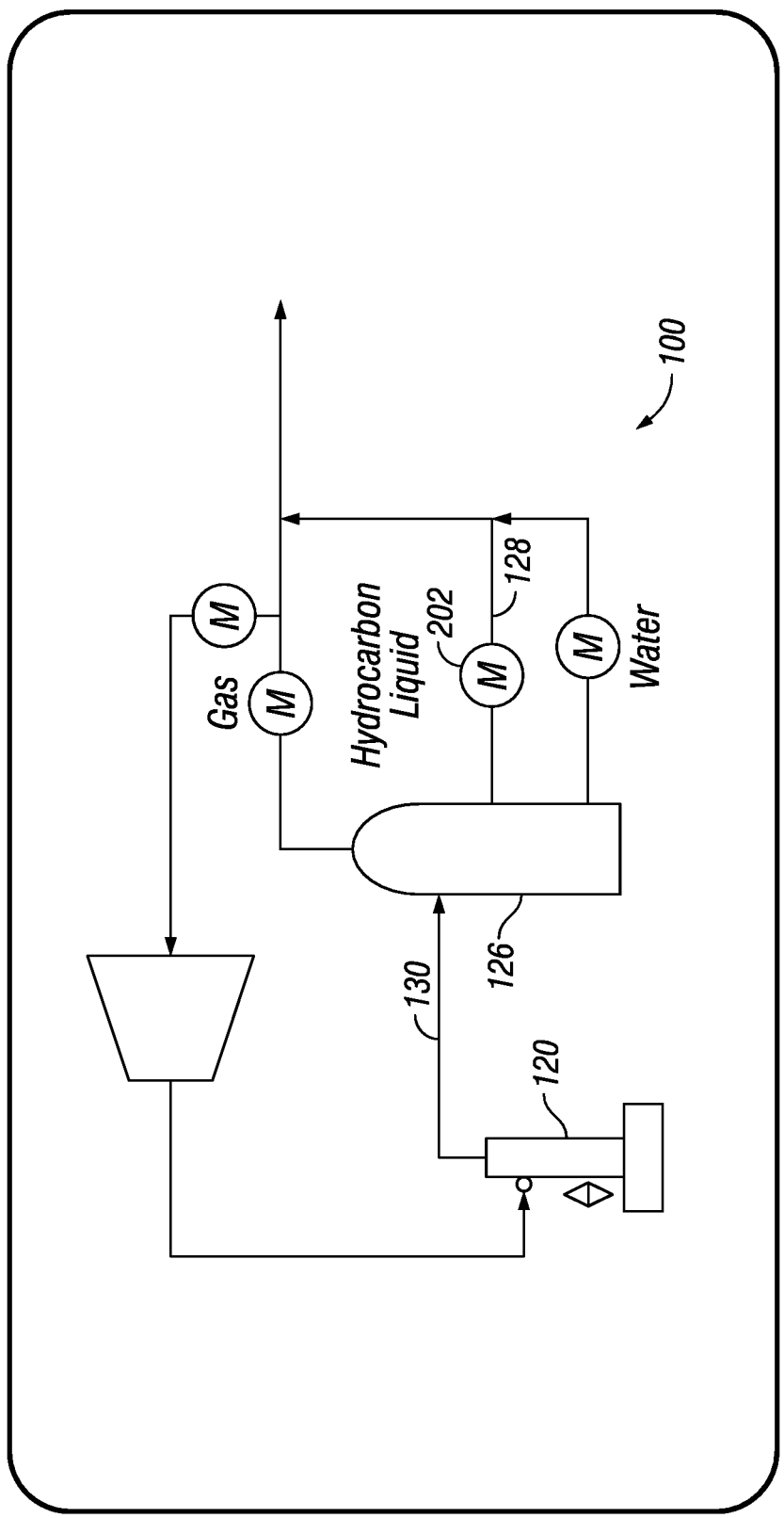
FIG. 1 is an illustrative working environment wherein the smart flow meter device could operate.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

To further assist the reader's understanding of the disclosed systems and methods, an environment for their use and operation is described. For example, an illustrative resource extraction system 100 is shown in FIG. 1, which may include a well 120 and separator 126. A measurement system 202 is attached to a flowline 128 that is a fluid connection with a connector 130 and the separator 126. As illustrated the resource extraction system 100 may be configured and used to measure hydrocarbons (e.g., oil and/or natural gas) and optionally water through the addition or repurposing of measurement system 202. When assembled, the separator 126 may couple to the well 120 and include a variety of valves, fittings, and controls for operating the separator 126 to produce the well 120. As explained below, the flow measurement system 202 may be configured to measure the flow of a fluid through the flowline 128. However, it should also be appreciated that one or more measurement systems 202 may be used in any of the flowlines of the resource extraction system 100, including the gas and water flowlines.

Figure 2:
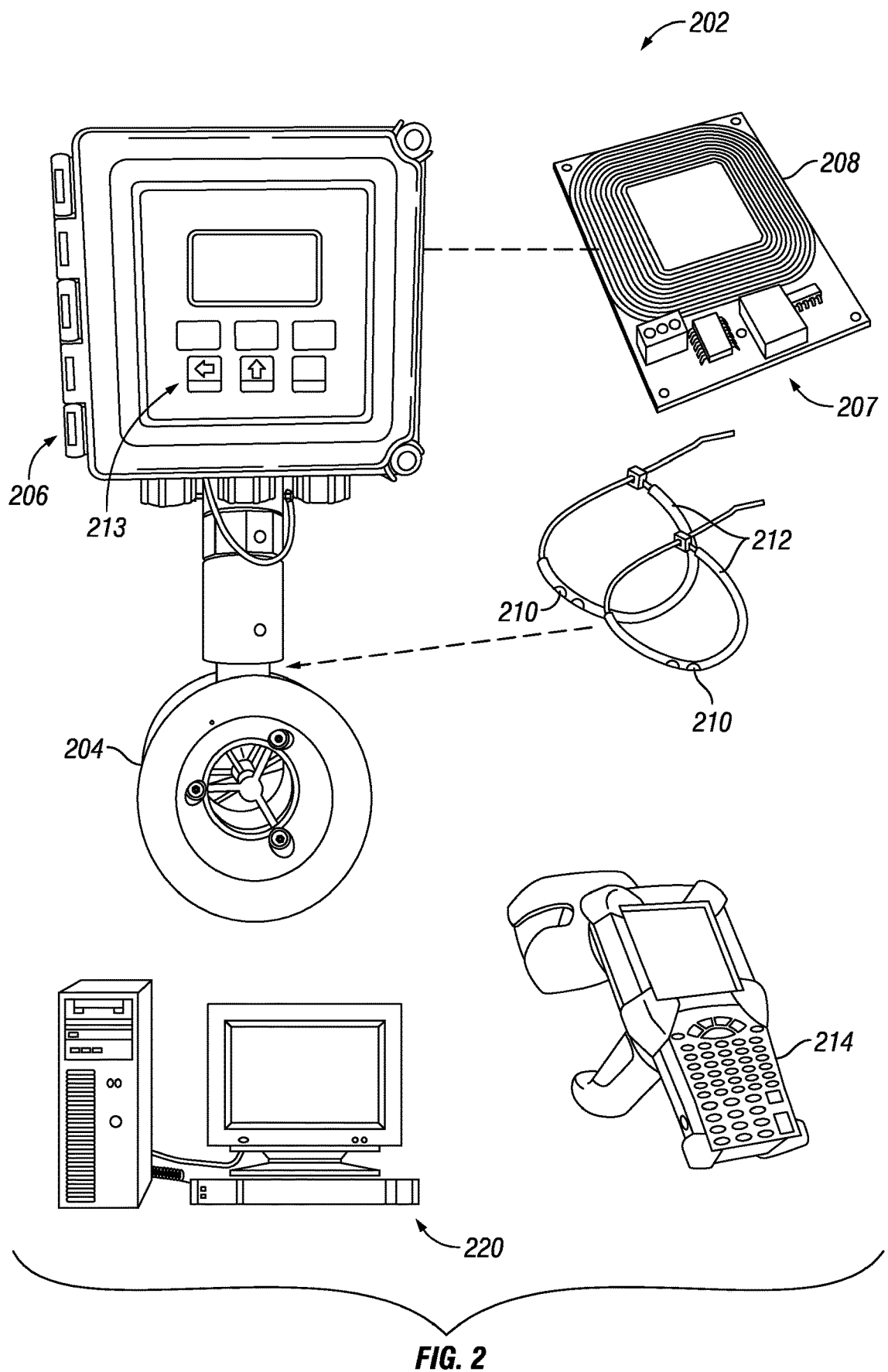
FIG. 2 is an illustrative embodiment of a flow meter device, an embedded chip, and a portable reader.

FIG. 2 shows an illustrative embodiment of a measurement system 202. The measurement system 202 can include a measurement device/meter 204, such as a flow meter to measure units of fluid passing through the meter 204, and meter electronics 206. Although not shown, the measurement system 202 may also include a power source.

The meter 204 may be characterizable by one or multiple K-factors over its operating range. For the example of a flow meter 204 with multiple K-factors, the meter performance could be represented by K-factor values at specified meter output pulse frequencies that originated for test data or it could be represented by mathematical coefficients that would create a curve that could approximate the multiple K-factor sets. The K-factor(s) can account for variations in flow meter dimensions, surface finish, bearing drag, magnetic drag, or other tolerance variations occurring during manufacture. The K-factor(s) can represent the various number of pulses per unit of volume at various frequencies of the flow meter 204 as measured with a gas or as measured with a liquid. The K-factor may be in units of frequency or in units of time (i.e., a wave period) or any other derivative or origin data that can be used to derive the equivalent of a K-factor like meter response versus flow reference. Other meter calibration values can quantify the flow effect of fluid density or viscosity.

Other meter calibration values are contemplated and are included within the scope of the invention and claims, e.g., Reynolds number. It should be noted that the meter 204 being a flow meter is used for the purpose of description of this embodiment. However, any type of sensor could be used in conjunction with the measurement system 202.

The meter 204 measurements are communicated to the meter electronics 206 to be converted to data. As an example, the meter electronics 206 may include a totalizer for converting the meter 204 measurements to data and then processing, storing, or also possibly displaying the measurement data. It should be appreciated though that the meter electronics 206 may be any type of electronics for receiving measurements from the meter 204, such as but not limited to other types of flow computers. The measurement data may also be processed and then output to another device for further analysis. As shown, the meter electronics 206 may include an electronics board 208 that includes, for example, a central processing unit such as a microchip with a processor and any manner of integral or independent electronic storage medium. The microchip may calculate, for example, fluid flow from data received through the meter 204. The electronics board 208 microchip also has the capability of loading the K-factor data for the meter 204 into a K-factor data table such as a database stored on the storage medium. Also included in the meter electronics 206 is a communication interface 207 described further below. Optionally, the meter electronics 206 may further include a visual indicator that the meter 204 was operated under a condition outside of its specified operating range. The actual condition data may be recorded and displayed on the electronics 206.

The measurement system 202 may also include one or more RFID tags 210, which may be passive or active RFID tags. Data regarding the calibration, or K-factor, data for the meter 204 is stored on the RFID tag 210. Other data for the meter 204, such as meter type, may also be stored on the RFID tag 210. For example, this other data meter type data could at least include:
a. minimum-rated flow capacity;
b. maximum-rated flow capacity;
c. minimum pulse amplitude or pulse amplitudes at various frequencies;
d. model number;
e. serial number;
f. assigned user tag number;
g. materials of construction;
h. agency certifications; and
i. date of manufacture or calibration.

The K-factor data may be loaded onto the RFID tag 210 by the manufacturer of the meter 204 or by any person or entity having calibrated the meter 204. The RFID tag 210 may be attached to the meter 204 in any suitable form. As shown, the RFID tag 210 is included in a band 212 connected with a portion of the exterior of the meter 204 as shown by the dotted arrow. The band 212 may also include an identification reference that matches an identification reference on the meter 204 to ensure quality control in matching the RFID tag 210 to the correct meter 204. The identification reference may be visual or may be stored as data readable by a device, such as a portable RFID reader.

The RFID tag 210 is in communication with the meter electronics 206 through the communication interface 207, such as an RFID reader, that is part of the meter electronics 206. Being in communication enables the meter electronics 206 to synchronize with the RFID tag 210 and wirelessly load the K-factor data for the meter 204 from the RFID tag 210. The K-factor data for the meter 204 can thus be communicated to the meter electronics 206 and used by the electronics 206 to calibrate the meter 204 measurements and properly calculate the measurement data. Other data regarding the meter 204, such as the type of meter and the meter operational range, may also be communicated from the RFID tag 210 to the meter electronics 206. The communication interface 207 can be configured to communicate with the RFID tag 210 for the meter 204 as well as RFID tags on other flow meters, and can also be used to communicate with other measurement systems. Alternatively, the communication interface 207 can receive the meter calibration values from a remote terminal or device.

The data on the RFID tag 210 may also be synchronized with other electronics than the meter electronics 206. As described above, the meter 204 and RFID tag 210 can be labeled with identification references. A portable RFID reader/writer 214 may then be used to read and store the identification reference in a database. A quality control service could later use the portable reader 214 to confirm that the RFID tag 210 is on the correct meter 204. Additionally, RFID tag 210 information read by the portable reader may also be capable of sending data read from the RFID tag 210 to a logging facility 220, which may be remote from the meter 204 and meter electronics 206. The logging facility 220 may also receive data from other meters 204.

As an advantage, the measurement system 202 can remotely read the meter calibration values, such as obtaining the meter calibration values from the meter 204 through the communication interface 207. The values can be read wirelessly, for example, over radio-frequency electromagnetic fields. The values can also be read at any time. Alternatively, the meter calibration values can be directly entered into the measurement system 202 by a user through the user interface 213. In another alternative, the meter calibration values can be obtained from other remote devices, such as the portable reader 214 through the communication interface 207.

The meter calibration values are used in operation by the flow meter electronics of the flow meter 202 to calibrate a flow measurement. The meter calibration values are typically obtained by measurement at the factory, under test conditions and are commonly stored in the meter electronics before the flow meter is shipped from the factory. In addition, the meter calibration values can be programmed or re-programmed into the meter electronics by a user in the field during equipment service sessions. As an advantage, if the meter 204 is re-configured, or repaired, the new calibration values can be re-programmed to the meter electronics 206 so that the meter 204 can still be identified. This programming is typically facilitated by the tag 210 attached to the meter 204, with the re-configured data written to the tag 210 or by an additional tag 210 that would be supplied with the replacement or retested flow meter parts. Therefore, the user can re-program the meter electronics 206 with correct calibration information if required, such as in the event of power loss, memory loss, re-configuration, etc., of the meter 204.

As an alternative, other communication interfaces can be used. The communication interface 207 can comprise any type of communication device. In one embodiment the communication interface 207 comprises a modem, network card, etc., configured to communicate over a network. The communication interface 207 comprises a wireless communication device, such as a radio or optical receiver or transceiver, for example.

Figure 3:
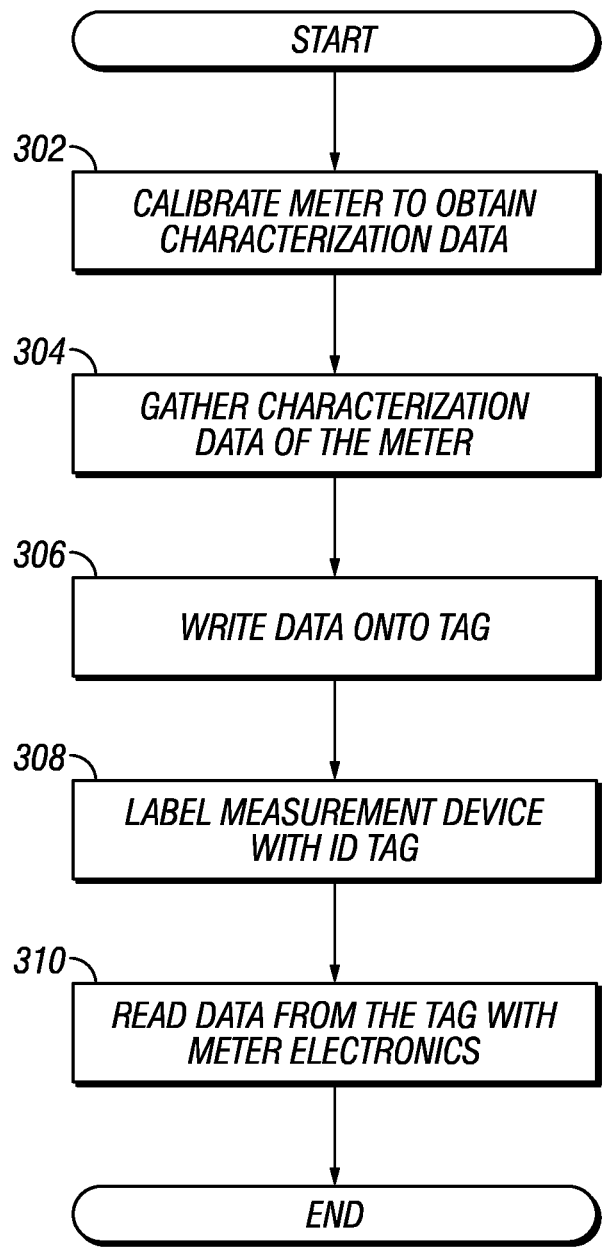
FIG. 3 is an illustrative chart that displays example methods for characterizing data for the flow meter device in accordance with one or more embodiments.

FIG. 3 illustrates example methods for the use of the measurement system in accordance with one or more embodiments. The illustrative flow diagram shows an example method for entering and retrieving characterization data from a measurement device, such as a flow meter. In block 302, the measurement device is calibrated at the factory or lab to determine the characterization data for the device before being sent to the customer or distribution. As explained above, the measurement device can be of any type. In block 304, the characterization data is collected. For example, the meter characterization data may include K-factors for flow over a specified range. The characterization data is written onto a RFID tag, as shown in block 306. The RFID tag is attached to the measurement device, as shown in block 308. The ID tag can also include any other information about the measurement device. The characterization information stored on the RFID tag is read by the meter electronics at 310 to enable the meter electronics to process the measurement information from the meter.

Although the present invention has been described with respect to specific details, it is not intended that such details should be regarded as limitations on the scope of the invention, except to the extent that they are included in the accompanying claims.

What is claimed is:

1. A measurement system for measuring a flow of fluid, the measurement system comprising:
a flow meter associated with characterization data and configured to obtain measurements of the flow;
a tag to store the meter characterization data;
meter electronics in communication with at least one of the meter or the tag, the meter electronics configured to:
receive the measurements of the flow;
receive the meter characterization data from the tag;
process the measurements of the fluid flow based on the meter characterization data to generate readable measurements, wherein the meter characterization data relates to functional operation of the flow meter and comprises information indicating at least in part how the flow meter obtains the measurements; and
provide the readable measurements to an interface on the meter electronics.

2. The system of claim 1 wherein:
the meter is characterizable over an operating range of different K-factors; and
the meter characterization data comprises a K-factor of the flow meter.

3. The system of claim 1, wherein the tag is readable by electronics other than the meter electronics.

4. The system of claim 1, wherein the meter electronics comprise a totalizer.

5. The system of claim 1, further comprising a portable device to read the meter characterization data.

6. The system of claim 5, wherein the tag can accept data from the portable device.

7. The system of claim 5, wherein the portable device is configured to load the meter characterization data into a database.

8. The system of claim 1, wherein the meter and the tag each further comprise matching identification references.

9. The system of claim 1, wherein the meter comprises an operating parameter and the meter electronics further include an indicator to indicate that the meter has operated outside of the operating parameter.

10. The system of claim 1, wherein the meter electronics are further configured to determine the readable measurements by using the characterization data to analyze the flow measurements to determine a rate of the flow.

11. The system of claim 1, wherein the meter characterization data further comprises a minimum-rated flow capacity of the flow meter.

12. The system of claim 1, wherein the meter characterization data further comprises a maximum-rated flow capacity of the flow meter.

13. The system of claim 1, wherein the meter characterization data further comprises a minimum-pulse amplitude of the flow meter.

14. The system of claim 1, wherein the meter characterization data further comprises a model number of the flow meter.

15. The system of claim 1, wherein the meter characterization data further comprises a serial number of the flow meter.

16. The system of claim 1, wherein the meter characterization data further comprises an assigned user tag number of the flow meter.

17. The system of claim 1, wherein the meter characterization data further comprises one or more materials of construction of the flow meter.

18. The system of claim 1, wherein the meter characterization data further comprises a date of manufacture of the flow meter.

19. The system of claim 1, wherein the meter characterization data further comprises a date of calibration of the flow meter.

20. The system of claim 1, wherein the meter characterization data further comprises one or more mechanical construction details of the flow meter.

21. A method of measuring comprising:
calibrating a meter and obtaining characterization data from the meter;
digitally storing the characterization data for the meter in a tag;
attaching the tag to the meter;
receiving measurements from the meter and the characterization data for the meter from the tag at meter electronics of the meter;
processing the received measurements from the meter and calibrating the measurements at the meter electronics using the characterization data from the tag to generate readable measurements, wherein the characterization data relates to functional operation of the meter and comprises information indicating at least in part how the meter obtains the measurements; and
provide the readable measurements to an interface on the meter electronics.

22. The method of claim 21, wherein:
calibrating the meter comprises characterizing the meter over an operating range of different K-factors; and
the characterization data comprises a K-factor of the meter.

23. The method of claim 21, wherein processing and calibrating the received measurements includes calculating a total amount of fluid flow measured by the meter.

24. The method of claim 21, wherein receiving the characterization data comprises wirelessly receiving the characterization data by electronics also receiving the measurements from the meter.

25. The method of claim 21, further comprising wirelessly receiving the characterization data with a portable device.

26. The method of claim 25, further comprising writing data to the tag with the portable device.

27. The method of claim 25, further comprising loading the characterization data into a database.

28. The method of claim 21, further comprising:
confirming the tag includes the characterization data for the meter.

29. The method of claim 21, further comprising indicating the meter has operated outside of an operating parameter.

30. The method of claim 21, wherein the method further comprises determining the readable measurements by using the characterization data to analyze the flow measurements to determine a flow rate of fluid.

31. A method for measuring a flow of fluid, the method comprising:
providing, via a tag, meter characterization data to a portable device;
providing, via wireless communications, meter characteristics to meter electronics;
process measurements of the fluid flow based on the meter characterization data to generate readable measurements, wherein the meter characterization data relates to functional operation of a flow meter and comprises information indicating at least in part how the flow meter obtains the measurements; and
provide the readable measurements to an interface.

* * * * *